US009454673B1

(12) United States Patent
Sarukkai et al.

(10) Patent No.: US 9,454,673 B1
(45) Date of Patent: *Sep. 27, 2016

(54) SEARCHABLE ENCRYPTION FOR CLOUD STORAGE

(71) Applicant: Skyhigh Networks, Inc., Cupertino, CA (US)

(72) Inventors: Sekhar Sarukkai, Cupertino, CA (US); Kaushik Narayan, San Jose, CA (US); Rajiv Gupta, Los Altos, CA (US); Paul Grubbs, Sunnyvale, CA (US)

(73) Assignee: Skyhigh Networks, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,460

(22) Filed: Nov. 7, 2014

Related U.S. Application Data (60) Provisional application No. 61/902,104, filed on Nov. 8, 2013.

(51) Int. Cl.
*H04L 29/06* (2006.01)
*G06F 21/62* (2013.01)
*G06F 17/30* (2006.01)
*H04L 9/14* (2006.01)

(52) U.S. Cl.
CPC ..... *G06F 21/6218* (2013.01); *G06F 17/30864* (2013.01); *H04L 9/14* (2013.01)

(58) Field of Classification Search
CPC .................................................. G06F 21/6218
USPC ......................................................... 713/165
See application file for complete search history.

(56) References Cited

U.S. PATENT DOCUMENTS

| | | | | |
|---|---|---|---|---|
| 7,949,666 | B2 * | 5/2011 | Wolff | G06F 17/30165 380/281 |
| 8,402,358 | B2 * | 3/2013 | Knauft | G06F 17/30616 707/706 |
| 8,930,691 | B2 * | 1/2015 | Kamara | G06F 21/6218 713/165 |
| 9,047,480 | B2 * | 6/2015 | Kahol | G06F 21/60 |
| 2011/0150466 | A1 * | 6/2011 | Loprieno | H04L 49/352 398/45 |

* cited by examiner

*Primary Examiner* — Dant Shaifer Harriman
(74) *Attorney, Agent, or Firm* — Van Pelt, Yi & James LLP (57) ABSTRACT

A method implements searchable encryption of cloud stored data by appending tokenized keywords to an encrypted file destined for a cloud storage service. In some embodiments, the tokenized keywords are appended to the header of the encrypted file. Searching of cloud-stored encrypted files using the native search capability of the cloud storage service is then possible by performing the search using the tokenized keywords. In alternate embodiments of the present invention, a method enables searching of cloud stored encrypted file using a cloud search appliance.

6 Claims, 9 Drawing Sheets

SEARCHABLE ENCRYPTION FOR CLOUD STORAGE

CROSS REFERENCE TO OTHER APPLICATIONS

This application claims priority to U.S. Provisional Patent Application No. 61/902,104, entitled SEARCHABLE ENCRYPTION FOR CLOUD STORAGE, filed Nov. 8, 2013, which is incorporated herein by reference for all purposes.

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

With cloud-based services coming into widespread use, data security for data and files stored on the cloud-based service providers become an important issue. In particular, cloud-based data storage has also come into widespread use. With more and more user data and files being stored in cloud-based data storage, data security for data and files stored on the cloud-based storage data has become an important issue.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a method implements searchable encryption of cloud stored data by appending tokenized keywords to an encrypted file destined for a cloud storage service. In some embodiments, the tokenized keywords are appended to the header of the encrypted file. Searching of cloud-stored encrypted files using the native search capability of the cloud storage service is then possible by performing the search using the tokenized keywords. In alternate embodiments of the present invention, a method enables searching of cloud stored encrypted file using a cloud search appliance.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, in the present description, "cloud content" or "cloud data" refers to data or files being processed or stored on a cloud-based service on behalf of an enterprise. The cloud-based service may be a cloud storage service, customer relationship management (CRM) services, information technology (IT) services or other types of cloud services. The cloud data or content may be stored as data files or in other formats.

With the proliferation of cloud-based services, an enterprise may wish to adopt one or more cloud-based services for data storage or other applications. Furthermore, the enterprise may deploy security measures to monitor and control the use of the cloud-based services from the enterprise's own private data network or by the enterprise's employees and users. In some cases, an enterprise data network redirects network traffic between a client device and a cloud-based service through a network intermediary. The client device may be situated within the enterprise data network or be associated with the enterprise. The network intermediary may provide monitoring and assessment of the enterprise's cloud usage. In some cases, the network intermediary is used to provide additional security function, such as file encryption for uploaded data.

Figure 1:
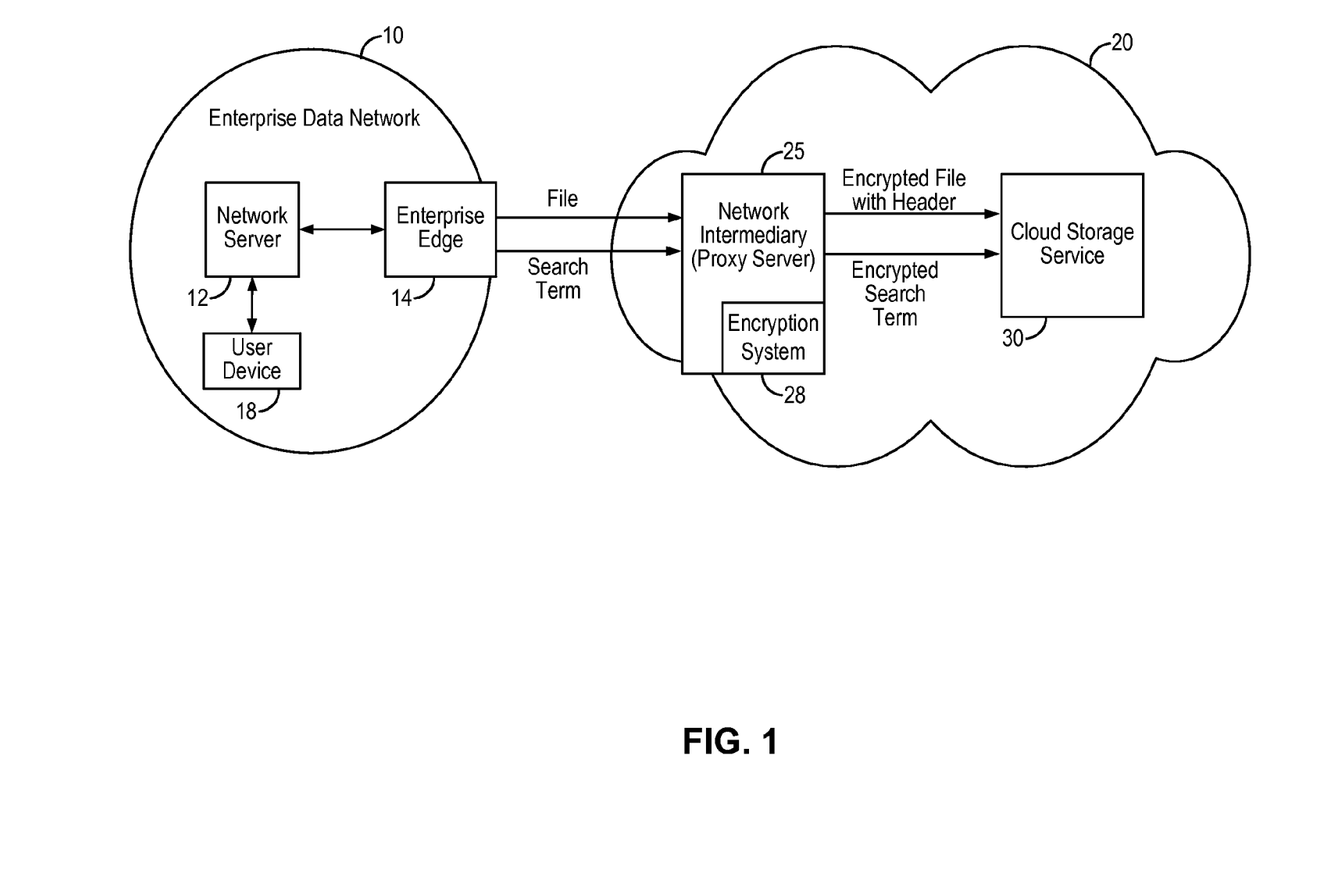
FIG. 1 is a block diagram illustrating a network intermediary providing encryption of cloud stored files in embodiments of the present invention.

FIG. 1 is a block diagram illustrating a network intermediary providing encryption of cloud stored files in embodiments of the present invention. Referring to FIG. 1, an enterprise may operate an enterprise data network 10 including one or more network servers 12 communicating with one or more user devices 18. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as cloud storage service 30, that are deployed on the public data network 20. Network traffic from the user device 18 is sent to the network server 12 and travels to the enterprise network edge 14 and then onto the cloud service providers. Network traffic from the cloud service providers are received at the enterprise network edge 14 and then transmitted onto the network server 12 to be distributed to the user device 18.

To ensure security associated with the use of one or more cloud based services, the enterprise may redirect all network traffic destined for one or more cloud service providers through a network intermediary 25, which can be implemented as a network proxy server. In the present description, a proxy server refers to a server, which can be a computer system or a software application, that acts as an intermediary for requests from clients seeking resources from other servers. The network intermediary 25 may be configured as reverse/forward proxies. Thus, requests and data from the user device 18 are intercepted by the network intermediary 25 before reaching the cloud storage service 30. In one embodiment, the network intermediary 25 is a cloud-based service and may be deployed on the publicly accessible Internet, such as public data network 20. In other embodiments, the network intermediary 25 may be deployed on a private data network of an enterprise, or be deployed on a third party private data network.

In the following description, the term "data" will be used to refer to data or files in any format that is being exchanged in the network environment described herein. In the present example, the cloud-based service 30 may be a cloud storage service, such as Box.com or collaboration services, such as Office 365. The cloud-based service 30 may also be a customer relationship management (CRM) service, information technology (IT) service or other types of cloud services.

In some embodiments, the network intermediary 25 performs encryption of data and files before sending the data and files onto the cloud storage service 30. Accordingly, in some embodiments, the network proxy server 25 includes an encryption system 28 which encrypts and decrypts file content based on one or more encryption algorithms. The content can be a file or list of words from the file. The encryption system may utilize keys, algorithms, pseudo random number generators and encoding algorithms suitable for encrypting the files from the user.

As thus configured, a user in an enterprise data network 10, wishing to use a cloud-based data storage service 30 for storing data files, uses a computing device 18 to access the cloud storage service 30. The user's request is redirected to the network proxy server 25 acting as the network intermediary. The network proxy server 25 may be configured as reverse/forward proxies. Thus, requests and files from the user are intercepted by the network proxy server 25 before reaching the cloud storage service 30. The network proxy server 25 performs, among other things, encryption of the files before sending the files onto the cloud storage service for storage. In this manner, data security is ensured as files are stored on the cloud service provider 30 as encrypted files and any one accessing the file on the cloud service provider directly will only see the encrypted text. When the file is to be retrieved from the cloud service provider 30, the network intermediary 25 retrieves the file and also decrypts the file. The decrypted file is then provided to the user device 18 through the enterprise data network 10.

While file-level encryption ensures data security, encryption prevents the stored files from being searched using the cloud service provider's native search routine. For example, cloud-based storage service provides search option where the stored files can be searched for keywords and this search functionality will not work if the files are encrypted.

In embodiments of the present invention, a method to implement searchable encryption of cloud stored data generates tokenized keywords for a file to be encrypted and attaches the tokenized keywords to the encrypted file. In one embodiment, the tokenized keywords are appended to the header of encrypted file. The encrypted file with the modified header is stored on a cloud service provider. With the encrypted file thus stored with the modified header, the cloud-stored encrypted file can be searched using the tokenized keywords.

Figure 2:
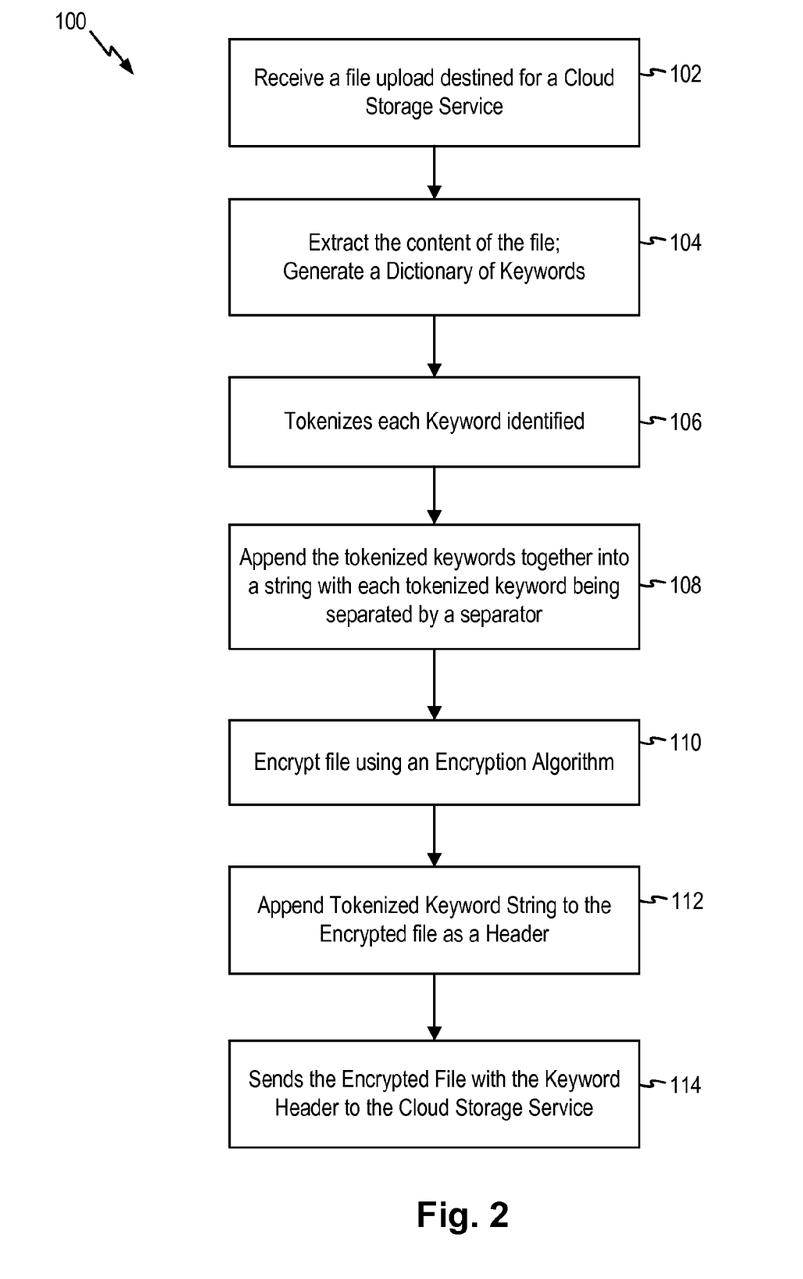
FIG. 2 is a flowchart illustrating a method for searchable encryption of cloud stored data in embodiments of the present invention.

FIG. 2 is a flowchart illustrating a method for searchable encryption of cloud stored data in embodiments of the present invention. The searchable encryption method may be implemented in the network proxy server 25 of FIG. 1 in embodiments of the present invention. More specifically, in some embodiments, the searchable encryption method may be implemented in the encryption system 28 of the network proxy server 25. Referring to FIG. 2, a method 100 starts when the network proxy server receives a file upload from a user device destined for a cloud storage service (102). For example, the network proxy server may intercept a file upload from a user within an enterprise data network to a cloud storage service. Instead of allowing the user to upload the file directly to the cloud storage service, the file is uploaded to the network proxy server.

At the network proxy server, the method 100 then extracts the content of the file (104). For instance, all the keywords of the file are extracted. The method 100 may generate a dictionary of these unique keywords from the content. In the present embodiment, keywords of a file represent some or all of the unique words in the file. The method then tokenizes each keyword identified (106). In one example, the method 100 tokenizes the keywords using a hash-based message authentication code (HMAC). For example, the method 100 may generate MAC (message authentication code) using the HMACSha1+Base64 encoding. After tokenization, the method then aggregates the tokenized keywords (the MACs) by appending the tokenized keywords together into a string with each tokenized keyword being separated by a separator (108). In one embodiment, the tokenized keywords are appended together using a space as the separator.

The method 100 encrypts and encodes the file using an encryption algorithm (110). In one example, the encryption algorithm is an AES256-GCM authenticated encryption. The method 100 then appends the string of tokenized keywords to the encrypted file as a file header (112). That is, the tokenized keyword string is used as a file header or is added to the native file header to form a modified file header to the encrypted file. The file header is also referred to as a keyword header in the present description. The method 100 then sends the encrypted file with the keyword header to the cloud storage service (114). In the present description, the string of tokenized keywords is appended to the file header of the encrypted file. In other embodiments, the string of tokenized keywords can be appended to the tail of the encrypted file. The specific location where the tokenized keyword string is attached is not critical to the practice of the present invention.

At the cloud storage service, the encrypted file including the keyword header is indexed to enable searching at the cloud storage service. That is, the tokenized keywords in the keyword header are indexed by the cloud storage service. Thus, the encrypted file is now searchable using the native search functionality of cloud storage service by providing the tokenized keywords as search terms.

Figure 3:
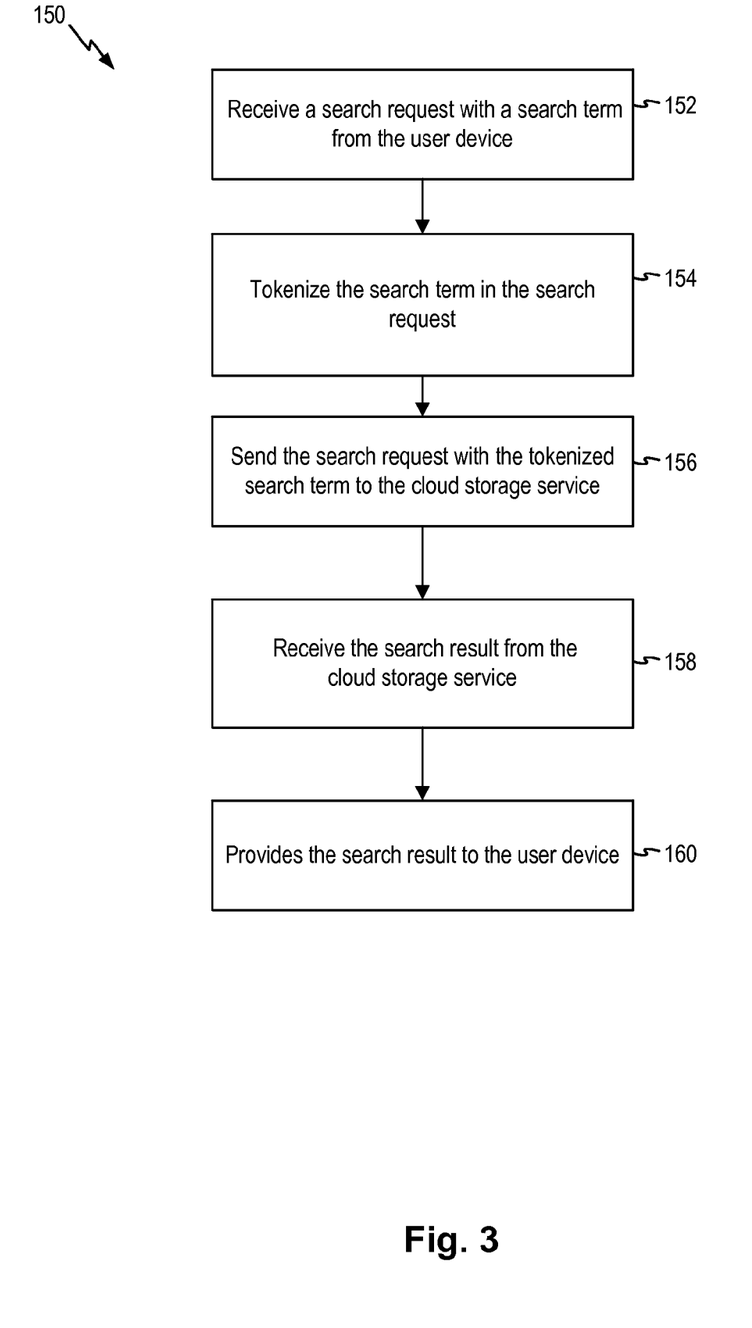
FIG. 3 is a flowchart illustrating a method for executing a search using the searchable encryption method of FIG. 2 in embodiments of the present invention.

FIG. 3 is a flowchart illustrating a method for executing a search using the searchable encryption method of FIG. 2 in embodiments of the present invention. The search method may be implemented in the network proxy server 25 of FIG. 1 in embodiments of the present invention. More specifically, in some embodiments, the searchable encryption method may be implemented in the encryption system 28 of the network proxy server 25. Referring to FIG. 3, a method 150 provides the process for executing a search of a cloud-stored encrypted file using the keyword header. The method 150 receives a search request with a search term from a user device (152). In particular, the user device executes a search request for a file that is stored on the cloud storage service. The user device's search request is intercepted by the network proxy server. Accordingly, the search request is received by the method 150 at the network proxy server.

Upon receiving the search request, the method 150 tokenizes the search term in the search request (154). The search term is tokenized using the same encoding algorithm used previously to generate the tokenized keywords of the encrypted file. In this manner, the tokenized search term will correspond to the tokenized keywords previously generated. The method 150 then sends the search request with the tokenized search term to the cloud storage service (156). At the cloud storage service, the search is executed using the tokenized search term. The cloud storage service uses its native search functionality to search for the tokenized search term in the indexed content. Because the cloud storage service has previously indexed the tokenized keywords in the keyword header of the encrypted file, the cloud storage service is able to detect a match of the tokenized search term to the tokenized keyword.

At 158, the method 150 receives the search result from the cloud storage service. At 160, the method 150 provides the search result to the user device.

When the network proxy server intercepts a request to download a file stored on the cloud storage device, the network proxy server retrieves the encrypted file and decrypts the file based on the encryption algorithm previously used. The decoded or unencrypted file is then provided to the user device.

In some situations, the files stored in the cloud storage service for a user may have some files that are encrypted and some files that are not. In that case, the searchable encryption method described above can be applied by using folder level encryption where all encrypted files are stored in a folder and the search requests will be directed to the encrypted folder which has the keyword header with tokenized keywords.

Figure 4:
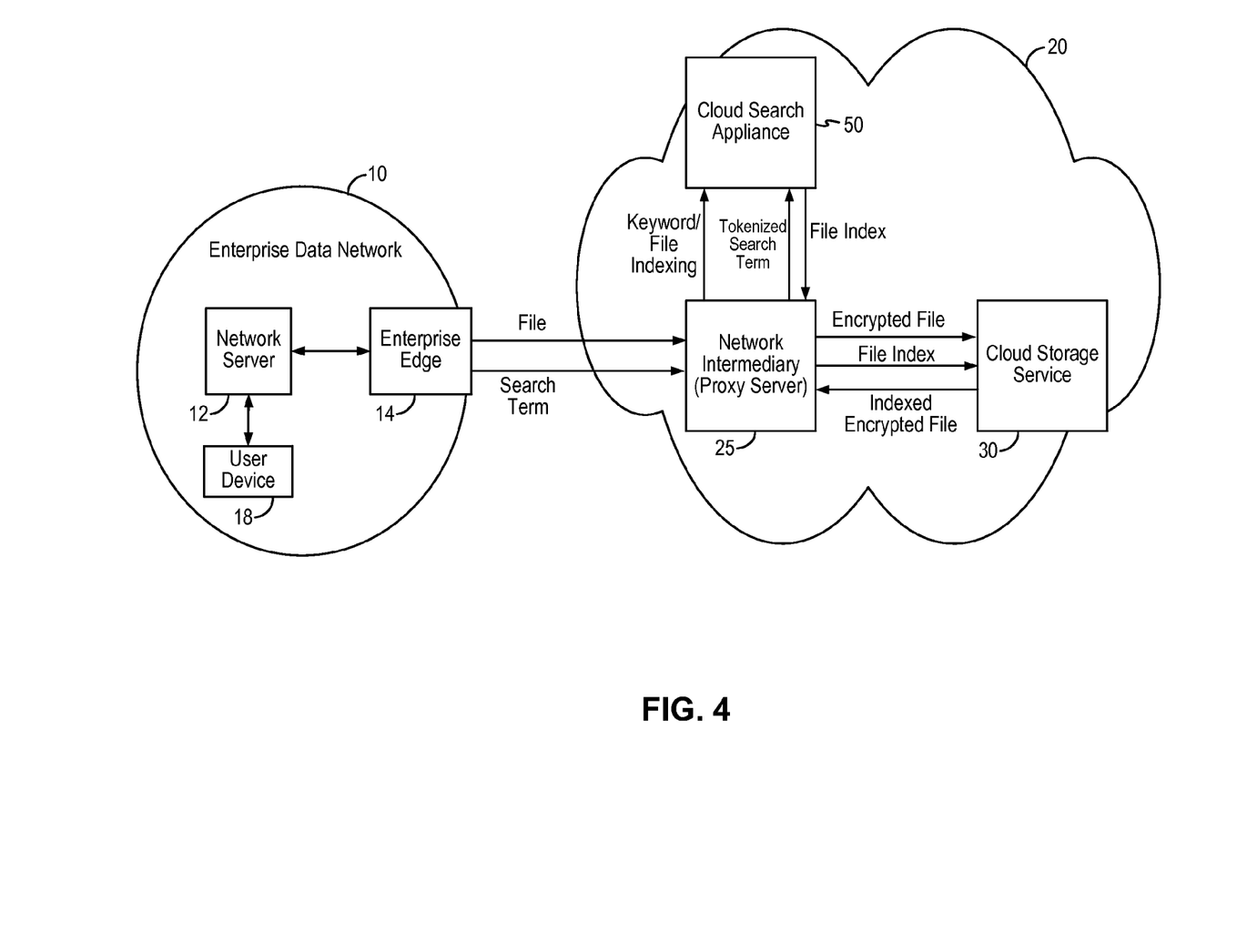
FIG. 4 is a block diagram illustrating a cloud search appliance providing searching of cloud stored encrypted files in embodiments of the present invention.

According to another aspect of the present invention, a cloud search appliance is coupled to the network proxy server to provide search functionality for encrypted files stored in cloud storage services. FIG. 4 is a block diagram illustrating a cloud search appliance providing searching of cloud stored encrypted files in embodiments of the present invention. Referring to FIG. 4, an enterprise data network 10 is configured to redirect network traffic to a network intermediary 25. The network intermediary 25 (or network proxy server 25) encrypts files on behalf of the enterprise data network for storage on the cloud storage service 30, as described above with reference to FIG. 1. To enable searching of the cloud-stored encrypted files, a cloud search appliance 50 is deployed to store a search index to facilitate searching of cloud-stored encrypted files at one or more cloud service providers. In some embodiments, the search index is an encrypted search index so that information and data of the enterprise do not exist as clear data outside of the enterprise data network.

In embodiments of the present invention, the cloud search appliance 50 is deployed on the publicly accessible Internet, such as public data network 20. In other embodiments, the cloud search appliance 50 may be deployed on a private data network of an enterprise, or be deployed on a third party private data network. The cloud search appliance provides searching functions for the enterprise data network, especially for cloud-stored encrypted data and files. In some embodiments, the cloud search appliance 50 provides an API (application programming interface) for receiving search requests and providing search results.

In some embodiments, the network proxy server 25 receives a file from the enterprise data network destined to the cloud storage service 30. The network proxy server 25 extracts the keywords from the content of the file and encrypts the file. The keywords are tokenized using a searchable encryption algorithm. The tokenized keyword and the file identifier are then added to an encrypted search index in the cloud search appliance 50. The network proxy server 25 then sends the encrypted file to the cloud storage service 30 for storage. In some embodiments, the file identifier includes an address pointer or a location pointer indicating the location at which the encrypted file is stored.

Accordingly, when the user from the enterprise data network executes a search request, the network proxy server 25 receives the search request and forwards the search request to the cloud search appliance 50. In particular, the network proxy server 25 encrypts or tokenize the search term and forwards the tokenized search term to the cloud search appliance 50. The cloud search appliance 50 searches the indexed content and returns the search result to the network proxy server 25. The search result includes one or more file identifiers identifying the locations at which one or more files containing the search term are stored. The network proxy server 25 can provide the search result to the user or can retrieve the one or more indexed encrypted files from the cloud storage service 30 and return one or more decrypted files to the user.

Figure 5:
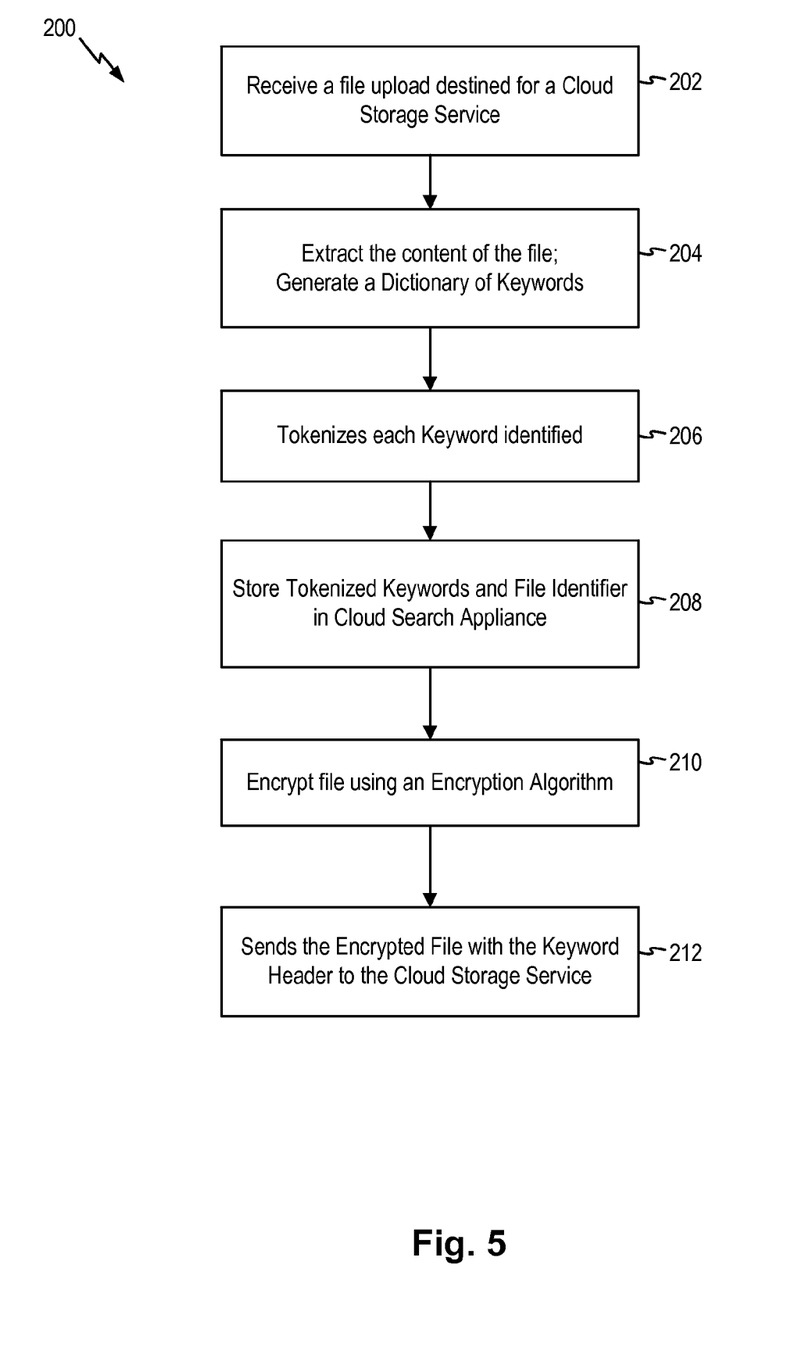
FIG. 5 is a flowchart illustrating a method for enabling searching of cloud stored encrypted files using a cloud search appliance in embodiments of the present invention.

FIG. 5 is a flowchart illustrating a method for enabling searching of cloud stored encrypted files using a cloud search appliance in embodiments of the present invention. The method may be implemented in the network proxy server 25 of FIG. 4 in embodiments of the present invention. Referring to FIG. 5, a method 200 starts when the network proxy server receives a file upload from a user device destined for a cloud storage service (202). For example, the network proxy server may intercept a file upload from a user within an enterprise data network to a cloud storage service. Instead of allowing the user to upload the file directly to the cloud storage service, the file is uploaded to the network proxy server.

At the network proxy server, the method 200 then extracts the content of the file (204). For instance, all the keywords of the file are extracted. The method 200 may generate a dictionary of these unique keywords from the content. In the present embodiment, keywords of a file represent some or all of the unique words in the file. The method then tokenizes each keyword identified (206). In one example, the method 200 tokenizes the keywords using a searchable encryption algorithm.

The method 200 then stores the tokenized keywords and the associated file identifier in the cloud search appliance (208). In particular, the tokenized keywords and file identifier are added to a search index in the cloud search appliance. In some embodiments, the file identifier includes an address pointer or a location pointer indicating the location at which the encrypted file is stored.

The method 200 encrypts and encodes the file using an encryption algorithm (210). In one example, the encryption algorithm is an AES256-GCM authenticated encryption. The method 200 then sends the encrypted file to the cloud storage service (212).

Figure 6:
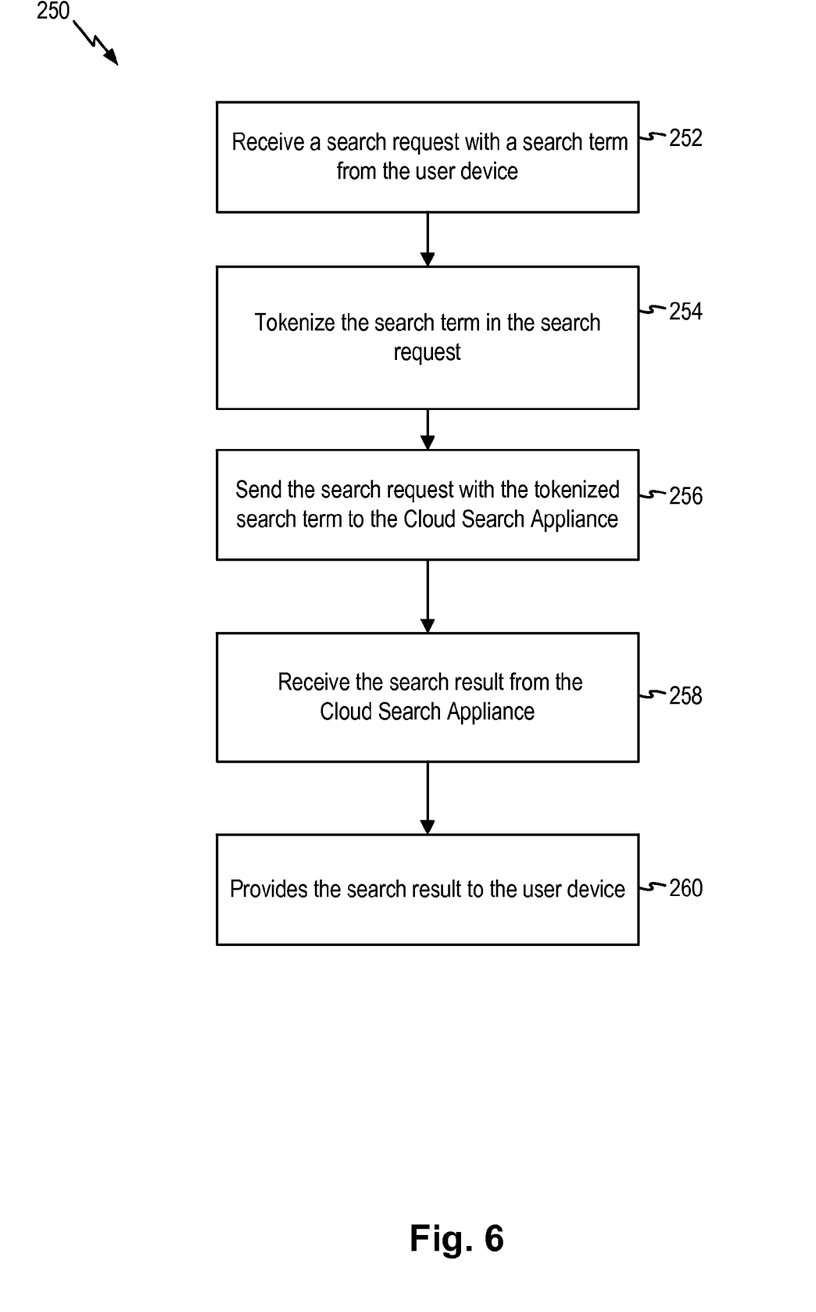
FIG. 6 is a flowchart illustrating a method for executing a search using the cloud search appliance of FIG. 4 in embodiments of the present invention.

FIG. 6 is a flowchart illustrating a method for executing a search using the cloud search appliance of FIG. 4 in embodiments of the present invention. The search method may be implemented in the network proxy server 25 of FIG. 4 in embodiments of the present invention. Referring to FIG. 6, a method 250 provides the process for executing a search of a cloud-stored encrypted file using the cloud search appliance. The method 250 receives a search request with a search term from a user device (252). In particular, the user device executes a search request for a file that is stored on the cloud storage service. The user device's search request is intercepted by the network proxy server. Accordingly, the search request is received by the method 250 at the network proxy server.

Upon receiving the search request, the method 250 tokenizes the search term in the search request (254). The search term is tokenized using the same encoding algorithm used previously to generate the tokenized keywords of the encrypted file. In this manner, the tokenized search term will correspond to the tokenized keywords previously generated. The method 250 then sends the search request with the tokenized search term to the cloud search appliance (256). At the cloud search appliance, the search is executed using the tokenized search term. The cloud search appliance searches its search index for the tokenized search term. In response to a match being found, the cloud search appliance returns the one or more file identifiers. At 258, the method 250 receives the search result from the cloud search appliance. At 260, the method 250 provides the search result to the user device.

Figure 7:
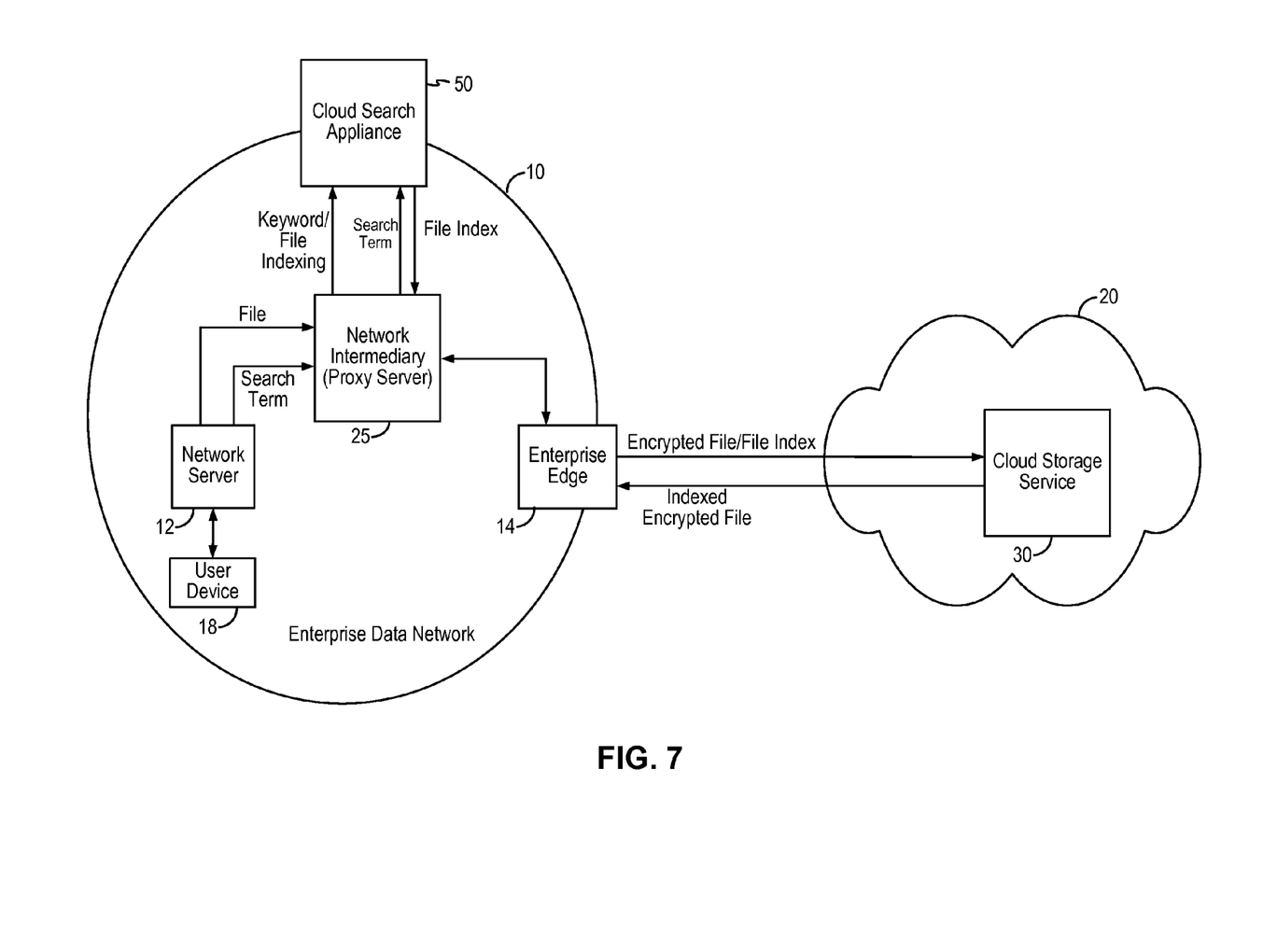
FIG. 7 is a block diagram illustrating a cloud search appliance providing searching of cloud stored encrypted files in alternate embodiments of the present invention.

According to embodiments of the present invention, a network proxy server and a cloud search appliance are deployed within an enterprise data network or deployed on a private data network of an enterprise to provide search functionality for encrypted files stored in cloud storage services. FIG. 7 is a block diagram illustrating a cloud search appliance providing searching of cloud stored encrypted files in alternate embodiments of the present invention. Referring to FIG. 7, an enterprise data network 10 is configured to redirect network traffic to a network intermediary 25. In the present embodiment, the network intermediary 25 is deployed within the enterprise data network 10. In other examples, the network intermediary 25 may be deployed in a private data network under the control of the enterprise. The network intermediary 25 (or network proxy server 25) encrypts files on behalf of the enterprise data network for storage on the cloud storage service 30. The encrypted file is provided to the enterprise edge 14 and then is sent to the cloud storage service 30. To enable searching of the cloud-stored encrypted files, a cloud search appliance 50 is deployed to store a search index to facilitate searching of cloud-stored encrypted files at one or more cloud service providers. In the present embodiment, the cloud search appliance 50 is deployed within the enterprise data network 10. In other examples, the cloud search appliance 50 may be deployed in a private data network under the control of the enterprise.

As thus configured, the cloud search appliance 50 exists behind the firewall of the enterprise data network 10. Accordingly, the cloud search appliance 50 may employ a search index is not encrypted and contains keywords in clear text. The network intermediary 25 encrypts files for storage on one or more cloud service providers 30. However, the network intermediary 25 stores keywords in the cloud search appliance 50 in clear text format.

In some embodiments, the network proxy server 25 receives a file from a user device of the enterprise data network destined to the cloud storage service 30. The network proxy server 25 extracts the keywords from the content of the file and also encrypts the file. The keywords and the file identifier are added to a search index in the cloud search appliance 50. The network proxy server 25 then sends the encrypted file through the enterprise edge 14 to the cloud storage service 30 for storage. In some embodiments, the file identifier includes an address pointer or a location pointer indicating the location at which the encrypted file is stored.

Accordingly, when the user from the enterprise data network executes a search request, the network proxy server 25 receives the search request and forwards the search request to the cloud search appliance 50. In particular, the network proxy server 25 forwards the search term to the cloud search appliance 50 as clear text. The cloud search appliance 50 searches the indexed content and returns the search result to the network intermediary 25. The search result includes one or more file identifiers identifying the locations at which one or more files containing the search term are stored. The network intermediary 25 can provide the search result to the user or can retrieve the one or more indexed encrypted files from the cloud storage service 30 and return one or more decrypted files to the user.

Figure 8:
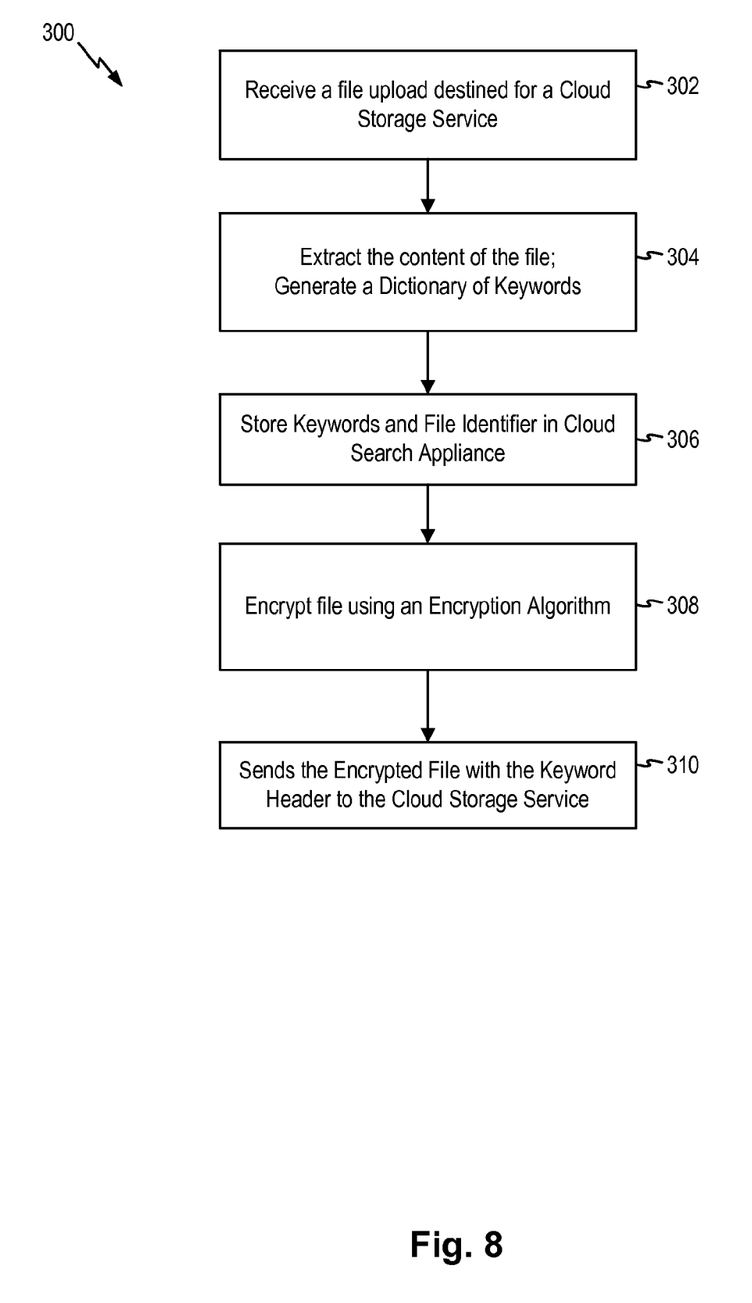
FIG. 8 is a flowchart illustrating a method for enabling searching of cloud stored encrypted files using the cloud search appliance of FIG. 7 in embodiments of the present invention.

FIG. 8 is a flowchart illustrating a method for enabling searching of cloud stored encrypted files using the cloud search appliance of FIG. 7 in embodiments of the present invention. The method may be implemented in the network proxy server 25 of FIG. 7 in embodiments of the present invention. Referring to FIG. 8, a method 300 starts when the network proxy server receives a file upload from a user device destined for a cloud storage service (302). For example, the network proxy server may intercept a file upload from a user within an enterprise data network to a cloud storage service. Instead of allowing the user to upload the file directly to the cloud storage service, the file is uploaded to the network proxy server.

At the network proxy server, the method 300 then extracts the content of the file (304). For instance, all the keywords of the file are extracted. The method 300 may generate a dictionary of these unique keywords from the content. In the present embodiment, keywords of a file represent some or all of the unique words in the file. The method 300 then stores the keywords and the associated file identifier in the cloud search appliance (306). In particular, the keywords and file identifier are added to a search index in the cloud search appliance. In some embodiments, the file identifier includes an address pointer or a location pointer indicating the location at which the encrypted file is stored.

The method 300 encrypts and encodes the file using an encryption algorithm (308). In one example, the encryption algorithm is an AES256-GCM authenticated encryption. The method 300 then sends the encrypted file to the cloud storage service (310).

Figure 9:
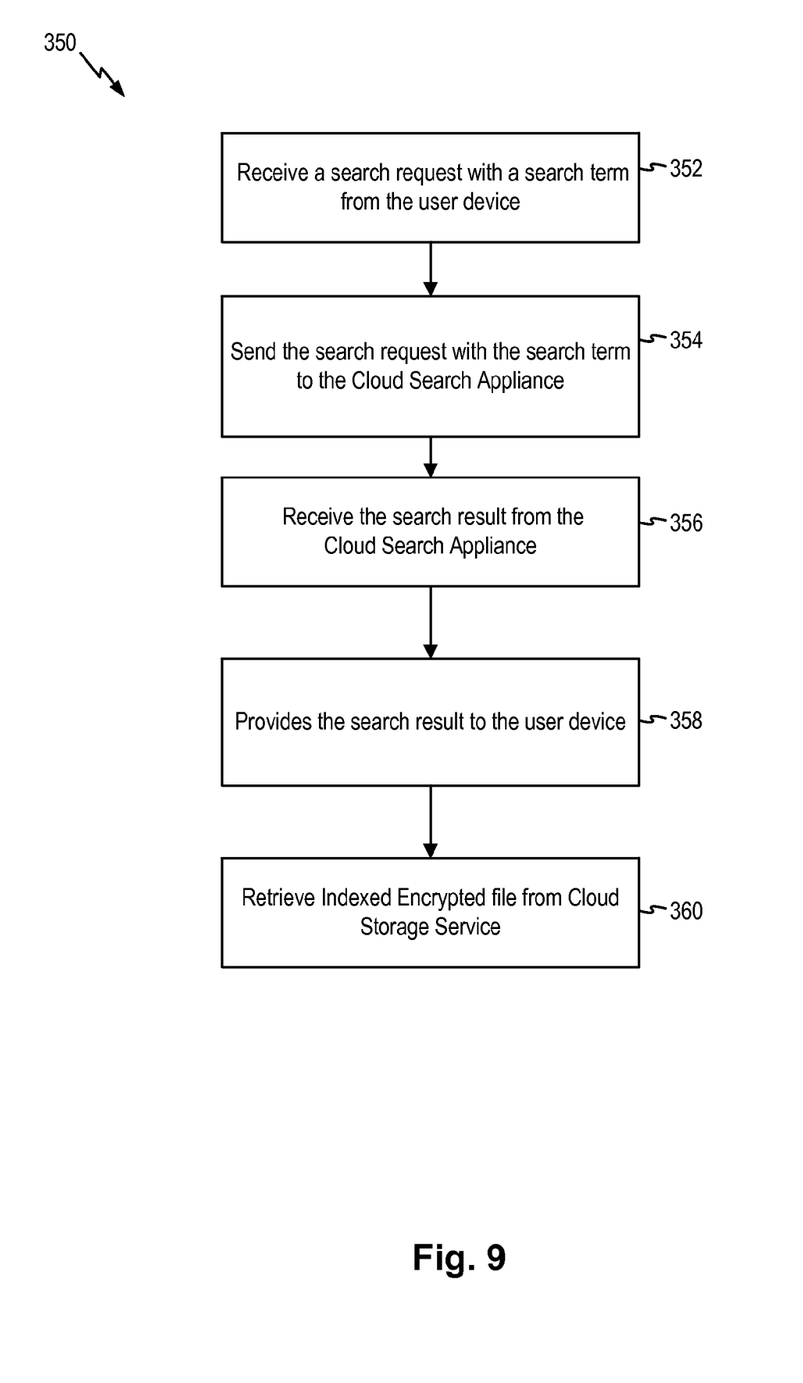
FIG. 9 is a flowchart illustrating a method for executing a search using the cloud search appliance of FIG. 7 in embodiments of the present invention.

FIG. 9 is a flowchart illustrating a method for executing a search using the cloud search appliance of FIG. 7 in embodiments of the present invention. The search method may be implemented in the network proxy server 25 of FIG. 7 in embodiments of the present invention. Referring to FIG. 9, a method 350 provides the process for executing a search of a cloud-stored encrypted file using the cloud search appliance. The method 350 receives a search request with a search term from a user device (352). In particular, the user device executes a search request for a file that is stored on the cloud storage service. The user device's search request is intercepted by the network proxy server. Accordingly, the search request is received by the method 350 at the network proxy server.

Upon receiving the search request, the method 350 sends the search request with the search term in clear text to the cloud search appliance (354). At the cloud search appliance, the search is executed using the search term in clear text. The cloud search appliance searches its search index for the search term. In response to a match being found, the cloud search appliance returns the one or more file identifiers. At 356, the method 350 receives the search result from the cloud search appliance. At 358, the method 350 provides the search result to the user device. In some embodiments, the method 350 may further retrieve the indexed encrypted file or files from the cloud storage service (360).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for searchable encryption of cloud stored data, comprising:
   receiving a file destined for a cloud storage service;
   extracting a plurality of keywords from the content of the file;
   tokenizing each keyword of the plurality of keywords using a first algorithm comprising a hash-based message authentication code (HMAC) to generate a plurality of tokenized keywords, a tokenized keyword being generated for each keyword;
   appending the plurality of tokenized keywords together into a string with each tokenized keyword being separated by a separator;
   encrypting the file using an encryption algorithm, wherein the encryption algorithm used to encrypt the file is different from the first algorithm used to tokenize the one or more keywords;
   appending the string of tokenized keywords to a file header or to a tail to the encrypted file;
   transmitting the encrypted file with the appended string of tokenized keywords to the cloud storage service for storage, where the tokenized keywords in the string are to be indexed at the cloud storage service by the cloud storage service;
   receiving a search request with a search term;
   tokenizing the search term in the search request by applying the first algorithm to the search term to generate a tokenized search term;
   transmitting the search request with the tokenized search term to the cloud storage service;
   receiving a search result, as a result of performing a search on the cloud storage service using the index created by the cloud storage service, the search result containing a first encrypted file from the cloud storage service in response to the tokenized search term matching a tokenized keyword in a string of tokenized keyword appended to the first encrypted file being stored at the cloud storage service;
   decrypting the first encrypted file to generate an unencrypted file containing the search term; and
   providing the unencrypted file as the search result.

2. The method of claim 1, wherein extracting a plurality of keywords from the content of the file comprises:
   extracting all of the unique words in the content of the file as the plurality of keywords.

3. The method of claim 1, wherein appending the plurality of tokenized keywords together into a string comprises:
   appending the plurality of tokenized keywords together into a string with each tokenized keyword being separated by a space.

4. A system for searchable encryption of cloud stored data, comprising:
   a network proxy server configured as a network intermediary to receive a file destined for a cloud storage service, the network proxy server being configured to extract a plurality of keywords from the content of the file, to tokenize each keyword of the plurality of keywords using a first algorithm comprising a hash-based message authentication code (HMAC) to generate a plurality of tokenized keywords, a tokenized keyword being generated for each keyword, to append the plurality of tokenized keywords together into a string with each tokenized keyword being separated by a separator, to encrypt the file using an encryption algorithm, wherein the encryption algorithm used to encrypt the file is different from the first algorithm used to tokenize the one or more keywords, to append the string of tokenized keywords to a file header or to a tail to the encrypted file, and to transmit the encrypted file with the appended string of tokenized keywords to the cloud storage service for storage, where the tokenized keywords in the string are to be indexed at the cloud storage service by the cloud storage service,
   wherein the network proxy server is further configured to receive a search request with a search term, to tokenize the search term in the search request by applying the first algorithm to the search term to generate a tokenized search term, to transmit the search request with the tokenized search term to the cloud storage service, to receive a search result, as a result of performing a search on the cloud storage service using the index created by the cloud storage service, the search result containing a first encrypted file from the cloud storage service in response to the tokenized search term matching a tokenized keyword in a string of tokenized keyword appended to the first encrypted file being stored at the cloud storage service, to decrypt the first encrypted file to generate an unencrypted file containing the search term, and to provide the unencrypted file as the search result.

5. The system of claim 4, wherein the network proxy server is further configured to extract all of the unique words in the content of the file as the plurality of keywords.

6. The system of claim 4, wherein the network proxy server is further configured to append the plurality of tokenized keywords together into a string with each tokenized keyword being separated by a space.

* * * * *